(12) United States Patent
Moriya et al.

(10) Patent No.: US 12,350,890 B2
(45) Date of Patent: Jul. 8, 2025

(54) COMPOSITE MATERIAL BONDING APPARATUS AND COMPOSITE MATERIAL BONDING METHOD

(71) Applicant: MITSUBISHI HEAVY INDUSTRIES, LTD., Tokyo (JP)

(72) Inventors: Makoto Moriya, Tokyo (JP); Makoto Ishida, Tokyo (JP); Shogo Otobe, Tokyo (JP); Akihiro Terasaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 69 days.

(21) Appl. No.: 18/015,213

(22) PCT Filed: Dec. 28, 2020

(86) PCT No.: PCT/JP2020/049237
§ 371 (c)(1),
(2) Date: Jan. 9, 2023

(87) PCT Pub. No.: WO2022/145012
PCT Pub. Date: Jul. 7, 2022

(65) Prior Publication Data
US 2023/0264431 A1    Aug. 24, 2023

(51) Int. Cl.
*B29C 65/22* (2006.01)

(52) U.S. Cl.
CPC .................. *B29C 65/222* (2013.01)

(58) Field of Classification Search
CPC ............ B29C 65/1448; B29C 65/1445; B29C 65/1432; B29C 65/1429; B29C 65/1412;
(Continued)

(56) References Cited

U.S. PATENT DOCUMENTS 3,016,085 A * 1/1962 Gassner ............. G05D 23/1919
156/499
3,316,687 A * 5/1967 Bartlett, Jr. ......... B29C 65/2061
53/399
(Continued)

FOREIGN PATENT DOCUMENTS

CN  106785232 A   5/2017
EP   2578381 A1   4/2013
(Continued)

OTHER PUBLICATIONS

Allaer, K., I. De Baare, W. Van Paepegem, J. Degrieck, Infrared welding of carbon fabric reinforced thermoplastics, JEC composites, vol. 77 (2012), pp. 44-47. (Year: 2012).*

(Continued)

*Primary Examiner* — Matthew J Daniels
(74) *Attorney, Agent, or Firm* — HAUPTMAN HAM, LLP (57) ABSTRACT

Provided is a composite material bonding apparatus that can reduce a cycle time when composite material members are bonded to each other. The composite material bonding apparatus includes a sheet-heater moving device that places a graphite heater at an insertion position between a first bonded surface of a first composite material member and a second bonded surface of a second composite material member such that the graphite heater is parallel to the first bonded surface and the second bonded surface facing the first bonded surface, and retracts the graphite heater to a retraction position from the insertion position. The first bonded surface and the second bonded surface are heated at the insertion position by the graphite heater, and then the graphite heater is moved to the retraction position by the sheet-heater moving device.

1 Claim, 5 Drawing Sheets

(58) Field of Classification Search
CPC ... B29C 65/006; B29C 65/221; B29C 65/222; B29C 65/223
See application file for complete search history.

(56) References Cited

U.S. PATENT DOCUMENTS

| | | | | |
|---|---|---|---|---|
| 4,971,639 | A * | 11/1990 | Quinn | B29C 65/7841 |
| | | | | 156/499 |
| 5,035,045 | A * | 7/1991 | Bowen | B29C 65/1664 |
| | | | | 29/730 |
| 5,151,149 | A * | 9/1992 | Swartz | B29C 66/1122 |
| | | | | 156/499 |
| 5,628,859 | A * | 5/1997 | Janin | H05B 3/10 |
| | | | | 392/407 |
| 11,458,720 | B2 * | 10/2022 | Okuda | B29C 66/3494 |
| 2017/0368761 | A1 | 12/2017 | Neufeld et al. | |
| 2018/0125155 | A1 * | 5/2018 | Kirupanantham | A43D 25/183 |

FOREIGN PATENT DOCUMENTS

| | | | | |
|---|---|---|---|---|
| JP | 3859321 | B2 | 12/2006 | |
| JP | 2007-245458 | A | 9/2007 | |
| JP | 4697909 | B2 * | 6/2011 | ....... H01L 21/67103 |
| JP | 2012-232564 | A | 11/2012 | |
| JP | 2017-205960 | A | 11/2017 | |
| WO | 2016/102292 | A1 | 6/2016 | |

OTHER PUBLICATIONS

English translation of JP-4697909-B2 published Jun. 8, 2011. (Year: 2011).*
PCT/ISA/210, "International Search Report for PCT International Application No. PCT/JP2020/049237," Jan. 26, 2021.
European Patent Office "Extended European Search Report with Search Opinion for European Patent Application No. 20968023.0," Jul. 24, 2023.

* cited by examiner

COMPOSITE MATERIAL BONDING APPARATUS AND COMPOSITE MATERIAL BONDING METHOD

RELATED APPLICATIONS

The present application is National Phase of International Application No. PCT/JP2020/049237 filed Dec. 28, 2020 the disclosure of which is hereby incorporated by reference herein in its entirety.

TECHNICAL FIELD

The present disclosure relates to a composite material bonding apparatus and a composite material bonding method for bonding composite members to each other, each containing fibers and a resin.

BACKGROUND ART

As a structural member for an aircraft or the like, a composite member containing fibers and a thermoplastic resin is used. When a plurality of composite members are bonded to each other, a bonding method has been known in which bonding surfaces are heated and melted and then the composite members are overlapped and bonded to each other (PTL 1). PTL 1 discloses that bonding surfaces of composite members are melted by an infrared heater provided in a heating furnace, the composite members are moved to a pressurization-bonding forming device, and then the bonding surfaces are overlapped and bonded to each other.

CITATION LIST

Patent Literature

[PTL 1] Japanese Patent No. 3859321

SUMMARY OF INVENTION

Technical Problem

However, since the bonding method disclosed in PTL 1 requires a step of conveying the composite members to the pressurization-bonding forming device after melting, cycle time increases, which is a problem.

In addition, since the bonding surfaces are heated using the infrared heater, there is a limit to temperature rising rate, and it is difficult to further shorten cycle time.

The present disclosure is conceived in view of such circumstances, and an object of the present disclosure is to provide a composite material bonding apparatus and a composite material bonding method capable of shortening cycle time when composite members are bonded to each other.

Solution to Problem

A composite material bonding apparatus (1) according to one aspect of the present disclosure includes: a sheet heater (3) having a planar shape; a sheet heater moving device that locates the sheet heater at an insertion position between a first bonding surface (W1c) of a first composite member (W1) and a second bonding surface (W2c) of a second composite member (W2) facing the first bonding surface, so as to be parallel to the first bonding surface and to the second bonding surface, and that retracts the sheet heater to a retract position to be retracted from the insertion position; and a control unit that controls the sheet heater moving device. The control unit causes the sheet heater to heat the first bonding surface and the second bonding surface at the insertion position, and then causes the sheet heater moving device to move the sheet heater to the retract position.

A composite material bonding method according to one aspect of the present disclosure includes: a heating step of locating a sheet heater having a planar shape at an insertion position between a first bonding surface of a first composite member and a second bonding surface of a second composite member facing the first bonding surface, so as to be parallel to the first bonding surface and to the second bonding surface, and of causing the sheet heater to heat the first bonding surface and the second bonding surface; a retracting step of retracting the sheet heater to a retract position to be retracted from the insertion position; and a bonding step of causing the first bonding surface and the second bonding surface to approach each other, and of bonding the first bonding surface and the second bonding surface to each other.

Advantageous Effects of Invention

It is possible to shorten cycle time when composite members are bonded to each other.

DESCRIPTION OF EMBODIMENTS

Hereinafter, one embodiment according to the present disclosure will be described with reference to the drawings.

Figure 1:
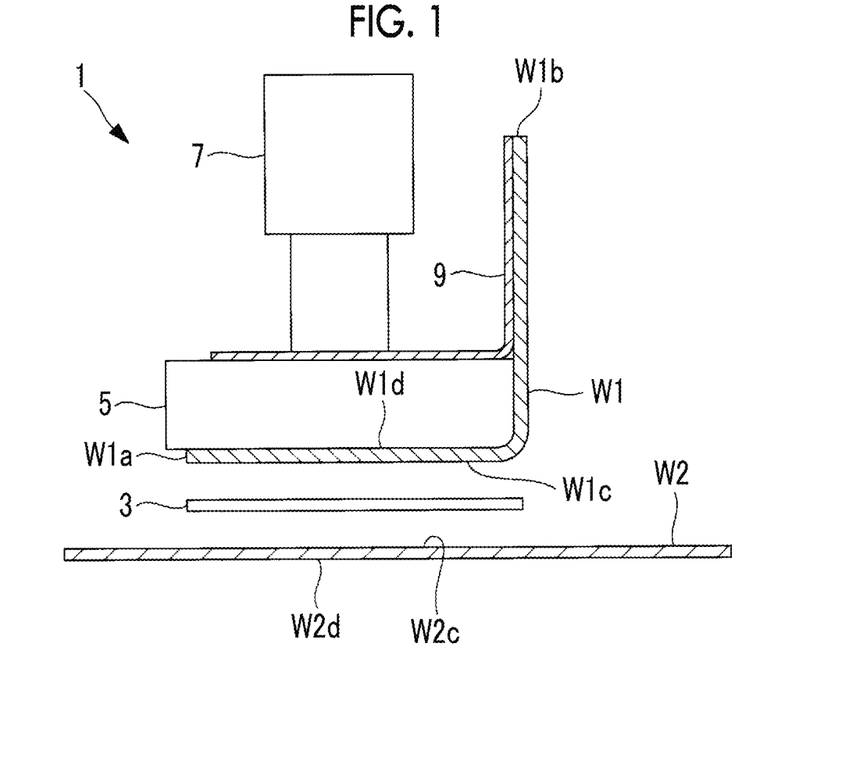
FIG. 1 is a cross-sectional view showing a composite material bonding apparatus according to one aspect of the present disclosure.

FIG. 1 shows a schematic configuration of a composite material bonding apparatus 1 according to the present embodiment. The composite material bonding apparatus 1 is used to bond a first composite member W1 and a second composite member W2 to each other.

The composite members W1 and W2 are made of a composite material containing a resin and fibers such as carbon fibers. The composite members W1 and W2 can be used as, for example, a structural member for an aircraft, a ship, a vehicle, or the like. The composite members W1 and W2 have already been shaped and solidified.

A thermoplastic resin is preferably used for the composite members W1 and W2. Examples of the composite material used for the composite members W1 and W2 include carbon fiber reinforced plastic (CFRP), glass fiber reinforced plastic (GFRP), aramid fiber reinforced plastic (AFRP), and the like.

The first composite member W1 includes a bottom portion W1a and a side portion W1b standing from one side of the bottom portion W1a, and has an L-shaped cross section. The first composite member W1 is a long member extending in a direction perpendicular to the paper surface of FIG. 1. A first bonding surface W1c that is a lower surface of the bottom portion W1a of the first composite member W1 is bonded to a second bonding surface W2c that is an upper surface of the second composite member W2.

The second composite member W2 is a long plate extending in the direction perpendicular to the paper surface of FIG. 1. A second back surface W2d that is a lower surface of the second composite member W2 is installed on a table (not shown).

The composite material bonding apparatus 1 includes a graphite heater (sheet heater) 3, a pressurizing plate (pressurizing means) 5, a pressurizing actuator (pressurizing means) 7, and a component holding stay (approaching and separating device) 9.

Figure 2:
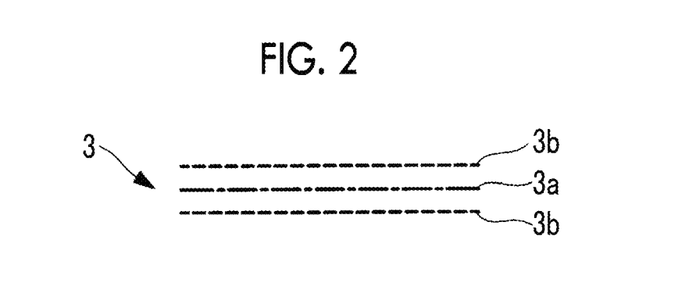
FIG. 2 is a longitudinal sectional view showing a layer configuration of a graphite heater.

As shown in FIG. 2, the graphite heater 3 has a structure in which a heat generating unit 3a made of graphite and insulating layers 3b are integrated with a front surface and a back surface of the heat generating unit 3a sandwiched between the insulating layers 3b. In the graphite heater 3, a thickness of a main portion of the graphite heater 3 is, for example, 0.2 mm or more and 0.5 mm or less. However, although not shown, a frame, a rigid layer, or the like is appropriately provided to maintain a plate shape of the graphite heater 3.

As shown in FIG. 1, the graphite heater 3 has a width substantially equal to or larger than or equal to a width (dimension in a horizontal direction in the same drawing) of the first bonding surface W1c. An area of a surface of the graphite heater 3 facing the bonding surfaces W1c and W2c is equal to or larger than or equal to an area of each of the bonding surfaces W1c and W2c. Accordingly, the entirety of both the bonding surfaces W1c and W2c can be uniformly heated in a short time.

The graphite heater 3 is connected to a graphite heater moving device (sheet heater moving device) (not shown). As shown in FIG. 1, the graphite heater moving device moves the graphite heater 3 between an insertion position between the first bonding surface W1c of the first composite member W1 and the second bonding surface W2c of the second composite member W2 and a retract position where the graphite heater 3 is retracted sideways from the insertion position.

As shown in FIG. 2, the heat generating unit 3a of the graphite heater 3 is made of graphite. The graphite can be obtained, for example, by sintering polyimide films. A short heating time and a high reaching temperature can be realized by using graphite for the heat generating unit 3a. For example, the heat generating unit 3a can reach 1300° C. in a heating time of approximately 0.2 seconds.

The insulating layers 3b are made of a material having electrical insulation, and for example, a resin having heat resistance, preferably a polyimide film is used. In addition, heat-resistant glass having heat resistance around 1000° C. may be used.

Figure 3:
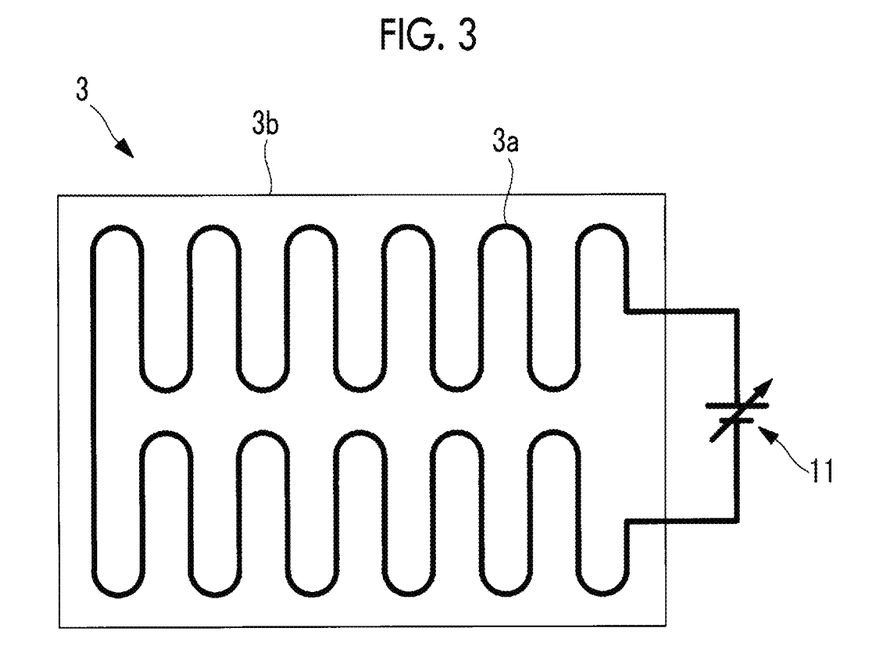
FIG. 3 is a plan view schematically showing the graphite heater.

FIG. 3 schematically shows the graphite heater 3 having a planar shape. Each of the insulating layers 3b has a rectangular shape. In the heat generating unit 3a, one wire-shaped unit is disposed in a meandering and folding manner, so as to be provided over the entire surface of the insulating layer 3b having a rectangular shape. Both end portions of the heat generating unit 3a are connected to a direct power supply 11 with variable current and/or voltage. The direct power supply is controlled by a control unit (not shown).

The control unit includes, for example, a central processing unit (CPU), a random access memory (RAM), a read only memory (ROM), a computer-readable storage medium, and the like. Furthermore, as one example, a series of processing for realizing various functions are stored in the storage medium or the like in the form of a program, and the CPU realizes the various functions by reading the program into the RAM or the like, and by executing information processing and arithmetic processing. Incidentally, a form in which the program is installed in the ROM or in other storage media in advance, a form in which the program is stored and provided in the computer-readable storage medium, a form in which the program is distributed via wired or wireless communication means, and the like may be applied. Examples of the computer-readable storage medium include magnetic disks, magneto-optical disks, CD-ROMs, DVD-ROMs, semiconductor memories, and the like.

The pressurizing plate 5 is, for example, a rectangular parallelepiped body made of metal, and is disposed such that a lower surface of the pressurizing plate 5 is in contact with a first back surface W1d that is an upper surface of the first composite member W1. The pressurizing actuator 7 is fixed to an upper portion of the pressurizing plate 5. The pressurizing plate 5 has predetermined rigidity to uniformly transmit a pressurizing force of the pressurizing actuator 7 to the first composite member W1.

The pressurizing actuator 7 applies a predetermined pressurizing force to the first composite member W1 via the pressurizing plate 5 according to a command from the control unit. As a driving force of the pressurizing actuator 7, an electric motor, air pressure, hydraulic pressure, or the like is used.

The component holding stay 9 holds the first composite member W1, and causes the first composite member W1 to approach and separate from the second composite member W2. The component holding stay 9 can hold the side portion W1b of the first composite member W1, for example, through vacuum suctioning. The pressurizing plate 5 and the pressurizing actuator 7 move up and down with operation of the component holding stay 9.

Next, an operation of the composite material bonding apparatus 1 described above will be described.

Figure 4:
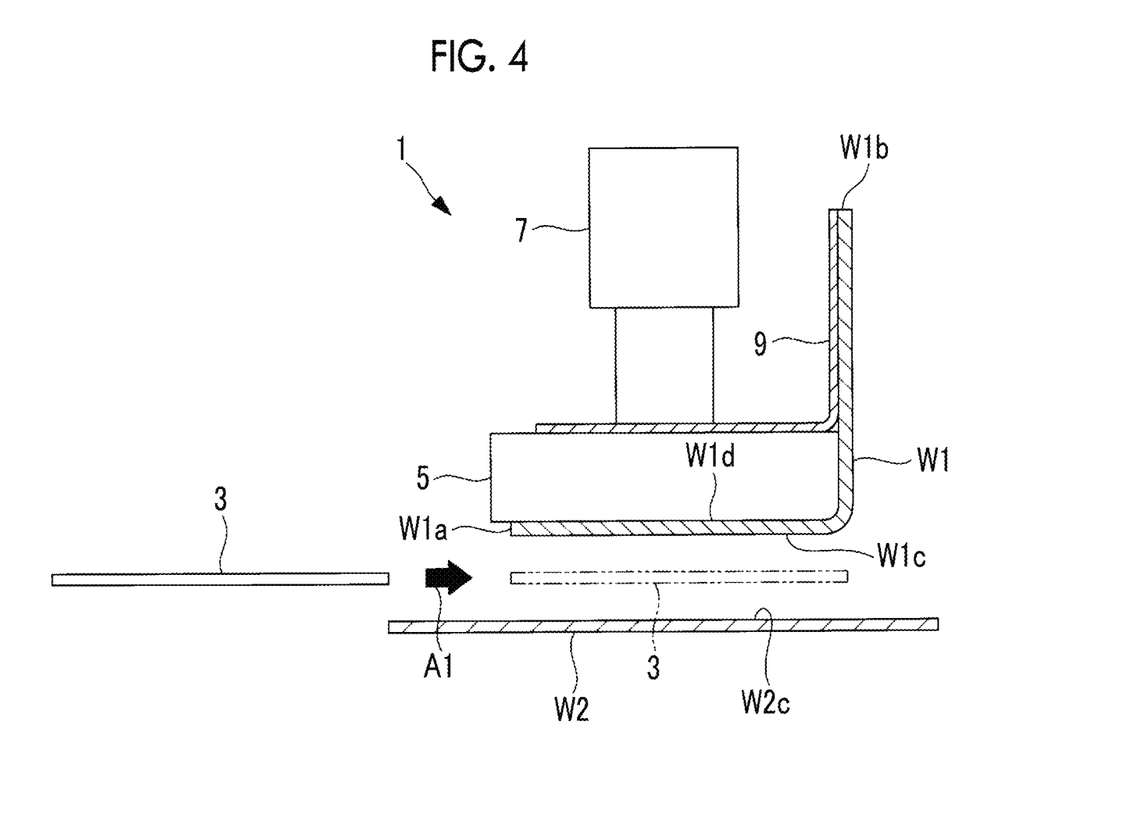
FIG. 4 is a cross-sectional view of the composite material bonding apparatus showing a state where the graphite heater is located at a retract position.

First, as shown in FIG. 4, the first composite member W1 is suctioned and held by the component holding stay 9, and a predetermined spacing is provided between the first bonding surface W1c of the first composite member W1 and the second bonding surface W2c of the second composite member W2 with the first bonding surface W1c and the second bonding surface W2c facing each other. The pressurizing plate 5 is disposed to be in contact with an upper surface of the bottom portion W1a of the first composite member W1. At this time, the graphite heater 3 is located at the retract position where the graphite heater 3 is retracted sideways from the insertion position between the first bonding surface W1c and the second bonding surface W2c.

Then, the graphite heater 3 is moved in a lateral direction as indicated by arrow A1 by the graphite heater moving device (not shown). Accordingly, the graphite heater 3 is located at the insertion position between the first bonding surface W1c and the second bonding surface W2c, as indicated by a chain double-dashed line. At this time, an upper surface and a lower surface of the graphite heater 3 are disposed at positions to be parallel to the first bonding surface W1c and to the second bonding surface W2c facing each other, and to cover entireties thereof.

Figure 5:
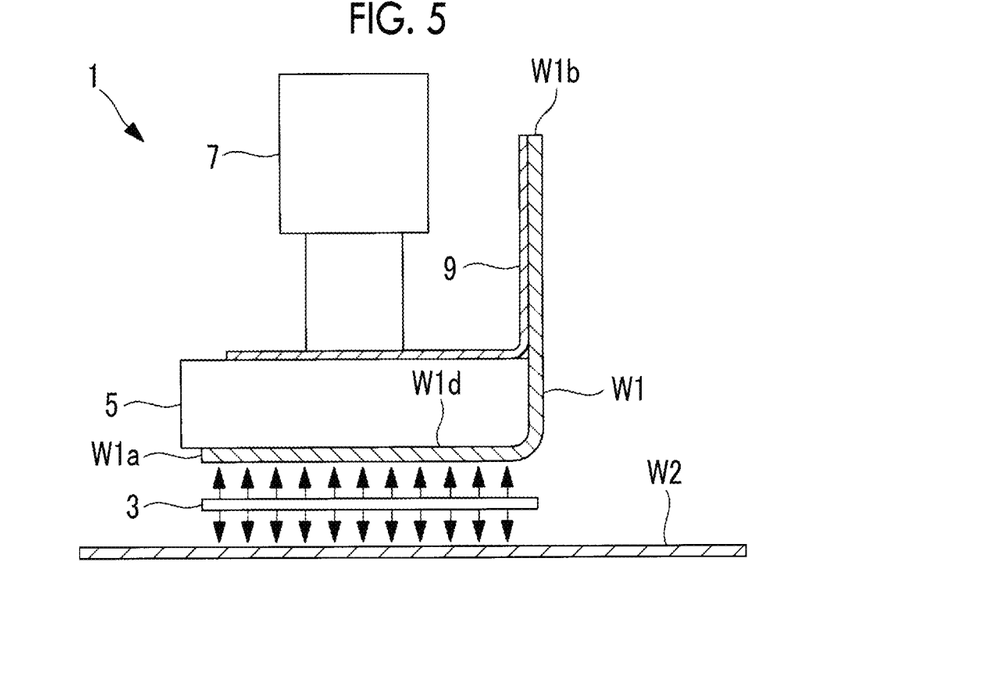
FIG. 5 is a cross-sectional view of the composite material bonding apparatus showing a heating step using the graphite heater.

In a state where the graphite heater 3 is located at the insertion position, the graphite heater 3 generates heat according to a command from the control unit. The heat to be generated from the graphite heater 3 is generated from both the upper and lower surfaces of the graphite heater 3, and heats the first bonding surface W1c and the second bonding surface W2c facing each other, as indicated by arrows in FIG. 5 (heating step). Accordingly, the resin located on the first bonding surface W1c and on the second bonding surface W2c are melted. Incidentally, heating may be performed by radiant heat in a state where the graphite heater 3 and each of the first bonding surface W1c and the second bonding surface W2c are spaced apart from each other as shown in FIG. 5, or heating may be performed by heat conduction in a state where the graphite heater 3 and each of the first bonding surface W1c and the second bonding surface W2c are in contact with each other.

A heating time and an output (current and/or voltage) of the graphite heater 3 are determined in advance according to the first composite member W1 and to the second composite member W2 to be heated, and are stored in, for example, a storage unit of the control unit.

Figure 6:
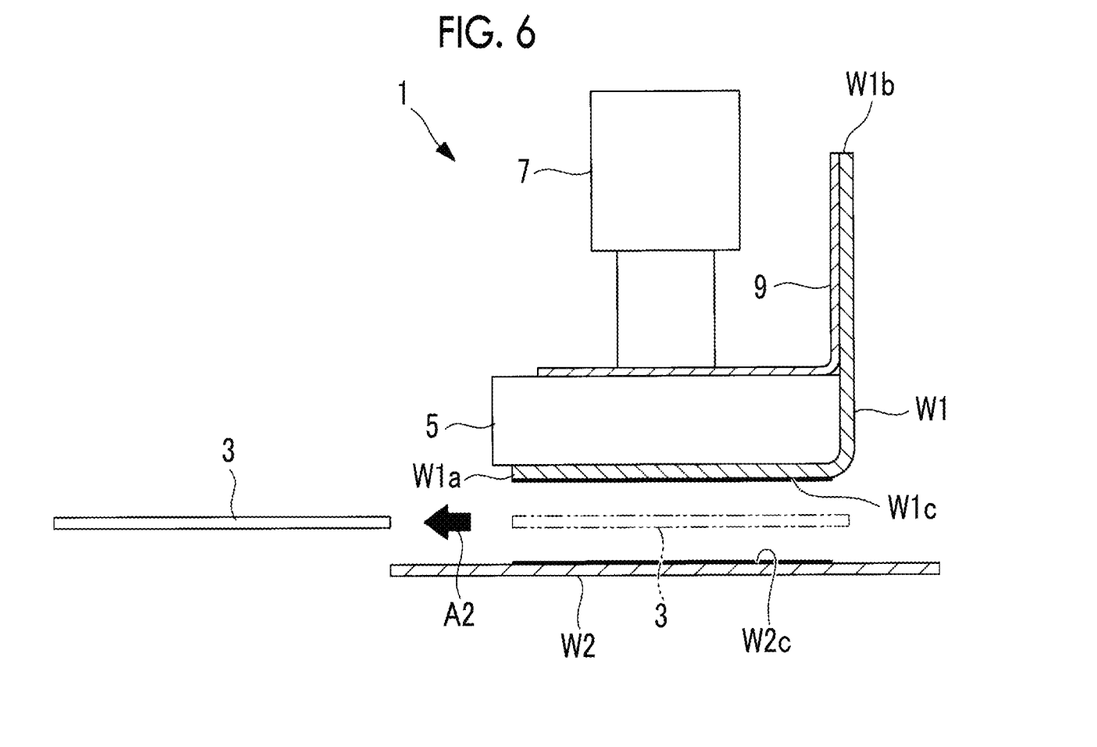
FIG. 6 is a cross-sectional view of the composite material bonding apparatus showing a state where the graphite heater is retracted from an insertion position to the retract position.

When the heating by the graphite heater 3 is completed, as indicated by arrow A2 of FIG. 6, the graphite heater 3 is moved from the insertion position to the retract position by the graphite heater moving device (retracting step).

Figure 7:
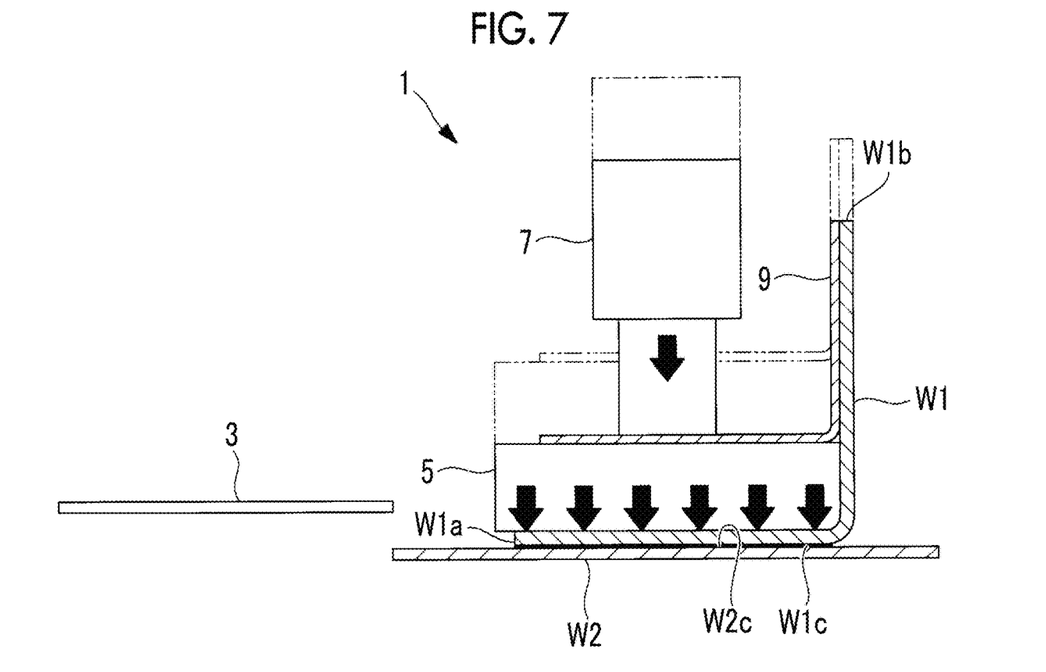
FIG. 7 is a cross-sectional view of the composite material bonding apparatus showing a state where pressurization is performed by a pressurizing plate.

Next, as shown in FIG. 7, while the first bonding surface W1c and the second bonding surface W2c are melted (namely, before solidification), the first composite member W1 is lowered by the component holding stay 9 to bring the first bonding surface W1c and the second bonding surface W2c into contact with each other. Then, the pressurizing actuator 7 is operated according to a command from the control unit to press the pressurizing plate 5 downward and to hold the pressurizing plate 5 for a certain time while pressurizing the bottom portion W1a of the first composite member W1 against the second composite member W2 (bonding step). Accordingly, the first composite member W1 and the second composite member W2 are bonded to each other at the bonding surfaces W1c and W2c. Temperatures on the bonding surfaces W1c and W2c during the bonding step can be adjusted by heat dissipation using a heat capacity of the pressurizing plate 5.

Figure 8:
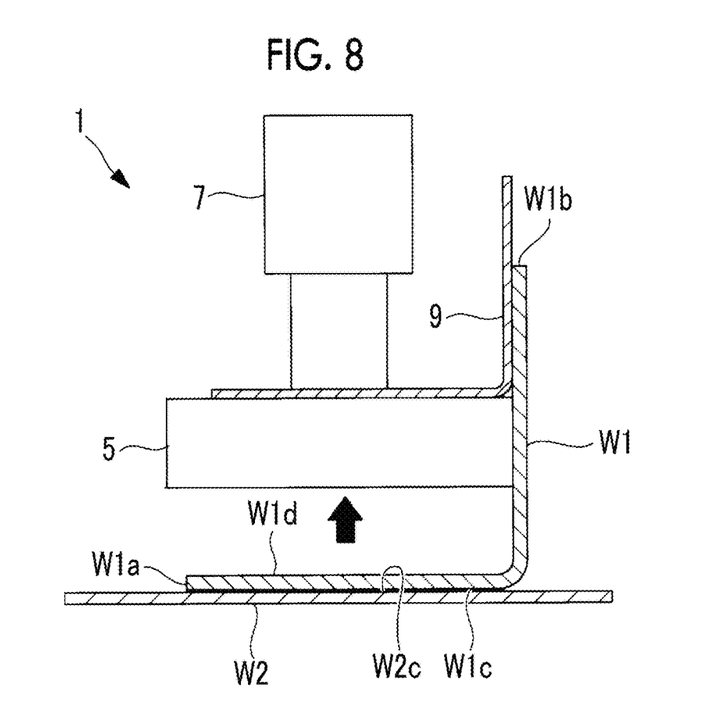
FIG. 8 is a cross-sectional view of the composite material bonding apparatus showing a state where the pressurizing plate is separated from a first composite member after bonding.

Thereafter, as shown in FIG. 8, after the pressurization by the pressurizing actuator 7 is released, the component holding stay 9 is raised with the suctioning of the first composite member W1 by the component holding stay 9 released. Accordingly, the pressurizing plate 5 is separated from the first back surface W1d of the first composite member W1.

In such a manner, the predetermined step of bonding the first bonding surface W1c and the second bonding surface W2c to each other is completed. When another first bonding surface W1c and another second bonding surface W2c in a longitudinal direction of the first composite member W1 and the second composite member W2 are next bonded to each other, a transfer device that moves a relative position of the graphite heater 3 with respect to the first composite member W1 and to the second composite member W2 locates the graphite heater 3 at a different position corresponding to the first bonding surface W1c and to the second bonding surface W2c. In this case, the graphite heater 3 may be transferred, or the first composite member W1 and the second composite member W2 may be transferred.

The actions and effects of the present embodiment described above are as follows.

The first bonding surface W1c and the second bonding surface W2c can be uniformly heated simultaneously in a short time by locating the graphite heater 3 at the insertion position and by disposing the graphite heater 3 to be parallel to the first bonding surface W1c and to the second bonding surface W2c. Then, the first bonding surface W1c and the second bonding surface W2c can be brought into contact with and bonded to each other by retracting the graphite heater 3 to the retract position. In such a manner, the graphite heater 3 is moved between the insertion position and the retract position to heat the first bonding surface W1c and the second bonding surface W2c facing each other, and the first bonding surface W1c and the second bonding surface W2c can be immediately bonded to each other by retracting the graphite heater 3 after heating, so that cycle time can be shortened.

Since the first bonding surface W1c and the second bonding surface W2c are pressurized after the graphite heater 3 is retracted from the insertion position to the retract position, pressurization bonding can be immediately performed after the retraction of the graphite heater 3, and cycle time can be shortened.

Since the pressurizing plate 5 is provided to be in contact with the first back surface W1d and/or with the second back surface W2d, the first bonding surface W1c and the second bonding surface W2c can be uniformly pressurized.

The graphite heater 3 is provided over one direction (left-right width direction in FIG. 1) of the first bonding surface W1c and the second bonding surface W2c. Accordingly, heating can be performed at once in a range in the width direction of the first bonding surface W1c and the second bonding surface W2c.

Heating is performed using the graphite heater 3. Namely, the graphite heater 3 is structured to include the heat generating unit 3a made of graphite, and the insulating layers 3b that sandwich and fix the heat generating unit 3a. A short heating time and a high reaching temperature can be realized by using graphite for the heat generating unit 3a.

The present embodiment described above can be modified as follows.

Figure 9:
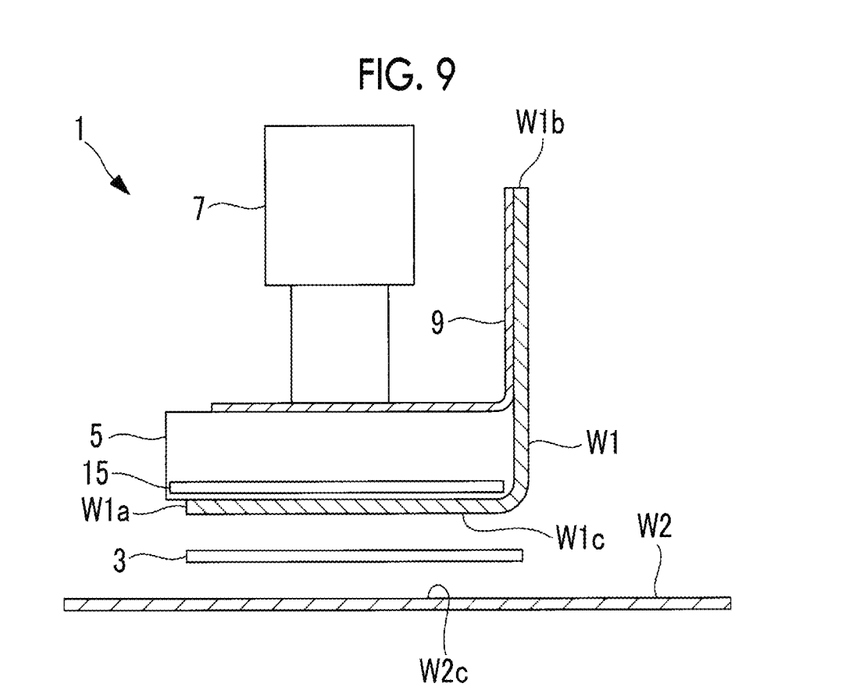
FIG. 9 is a cross-sectional view of a composite material bonding apparatus according to a modification example.

In the embodiment, the temperatures of the bonding surfaces W1c and W2c during the bonding step are adjusted by heat dissipation using the heat capacity of the pressurizing plate 5, but as shown in FIG. 9, the pressurizing plate may be provided with a temperature adjustment unit 15 that performs heating and/or cooling. A temperature of the temperature adjustment unit 15 is controlled by the control unit. As the temperature adjustment unit 15, an electric heater, a heat medium flow path through which a heating medium flows, or the like can be used for heating. In addition, a cooling element such as a Peltier element, a heat medium flow path through which a cooling medium flows, or the like can be used for cooling.

Since the temperature adjustment unit 15 is provided on the pressurizing plate 5, the bonding surfaces W1c and W2c can be heated and/or cooled by the pressurizing plate 5. Accordingly, a predetermined temperature suitable for bonding the bonding surfaces W1c and W2c to each other can be maintained during the bonding step, and proper bonding can be realized.

In addition, in the present embodiment, a case has been described in which the first composite member W1 having an L-shaped cross section and the second composite member W2 having a plate shape are bonded to each other, but the present disclosure is not limited to the shapes of the composite members, and can be widely used when composite members are connected to each other.

In addition, in the present embodiment, the graphite heater 3 is used, but an electric heater having a planar shape such as a stainless steel sheet heater may be used instead of the graphite heater 3.

In addition, in the present embodiment, a configuration has been employed in which the first composite member W1 is moved to approach and separate from the second composite member W2 that is fixed, but the present disclosure is not limited to the configuration, and the first composite member W1 may be fixed and the second composite member W2 may be moved, or both the first composite member W1 and the second composite member W2 may be moved.

The composite material bonding apparatus and the composite material bonding method described above in each of the embodiments are understood, for example, as follows.

A composite material bonding apparatus (1) according to one aspect of the present disclosure includes: a sheet heater (3) having a planar shape; a sheet heater moving device that locates the sheet heater at an insertion position between a first bonding surface (W1c) of a first composite member (W1) and a second bonding surface (W2c) of a second composite member (W2) facing the first bonding surface, so as to be parallel to the first bonding surface and to the second bonding surface, and that retracts the sheet heater to a retract position to be retracted from the insertion position; and a control unit that controls the sheet heater moving device. The control unit causes the sheet heater to heat the first bonding surface and the second bonding surface at the insertion position, and then causes the sheet heater moving device to move the sheet heater to the retract position.

The first bonding surface and the second bonding surface can be uniformly heated simultaneously in a short time by locating the sheet heater at the insertion position and by disposing the sheet heater to be parallel to the first bonding surface and to the second bonding surface. Then, the first bonding surface and the second bonding surface can be brought into contact with and bonded to each other by retracting the sheet heater to the retract position. In such a manner, the sheet heater is moved between the insertion position and the retract position to heat the first bonding surface and the second bonding surface facing each other, and the first bonding surface and the second bonding surface can be immediately bonded to each other by retracting the sheet heater after heating, so that cycle time can be shortened.

The sheet heater and the first bonding surface and/or the second bonding surface may be in contact with or separated from each other at the insertion position.

Further, the composite material bonding apparatus according to one aspect of the present disclosure further includes pressurizing means (5 and 7) for pressurizing the first composite member and/or the second composite member in a direction in which the first bonding surface and the second bonding surface approach each other. After the sheet heater is retracted from the insertion position to the retract position, the control unit causes the pressurizing means to pressurize the first bonding surface and the second bonding surface.

Since the first bonding surface and the second bonding surface are pressurized after the sheet heater is retracted from the insertion position to the retract position, pressurization bonding can be immediately performed after the retraction of the sheet heater, and cycle time can be shortened.

Further, the composite material bonding apparatus according to one aspect of the present disclosure further includes an approaching and separating device (9) that causes the first bonding surface and the second bonding surface to approach and separate from each other. After the first bonding surface and the second bonding surface are pressurized by the pressurizing means, the control unit causes the approaching and separating device to separate the first bonding surface and the second bonding surface from each other.

Since the first bonding surface and the second bonding surface are separated from each other after pressurization, the process can quickly proceed to the next step.

Further, the composite material bonding apparatus according to one aspect of the present disclosure further includes a transfer device that moves a relative position of the sheet heater with respect to the first composite member and to the second composite member. After the first bonding surface and the second bonding surface are separated from each other by the approaching and separating device, the control unit causes the transfer device to move a relative position between the sheet heater and each of the first composite member and the second composite member, and causes the transfer device to move the sheet heater to the insertion position between the first bonding surface and the second bonding surface that is a position different from a position of the first bonding surface and the second bonding surface that are pressurized.

The transfer device moves the relative position between the sheet heater and each of the first composite member and the second composite member, and moves the sheet heater to the insertion position between the first bonding surface and the second bonding surface that is a position different from the position of the first bonding surface and the second bonding surface that are pressurized. Accordingly, the bonding surfaces can be sequentially bonded to each other at different positions.

Further, in the composite material bonding apparatus according to one aspect of the present disclosure, the pressurizing means includes a pressurizing plate (5) provided to be in contact with a first back surface of the first composite member that is a back surface side of the first bonding surface and/or with a second back surface of the second composite member that is a back surface side of the second bonding surface.

Since the pressurizing plate is provided to be in contact with the first back surface and/or with the second back surface, the first bonding surface and the second bonding surface can be uniformly pressurized.

Further, in the composite material bonding apparatus according to one aspect of the present disclosure, the pressurizing plate includes a temperature adjustment unit (15) that performs heating and/or cooling.

Since the temperature adjustment unit is provided on the pressurizing plate, the bonding surfaces can be heated and/or cooled by the pressurizing plate. Accordingly, a predetermined temperature can be maintained during pressurization, and proper bonding can be realized.

Further, in the composite material bonding apparatus according to one aspect of the present disclosure, the sheet heater is provided over a predetermined one direction of the first bonding surface and the second bonding surface.

The sheet heater is provided over one direction of the first bonding surface and the second bonding surface. Accordingly, heating can be uniformly performed in a range in the one direction of the first bonding surface and the second bonding surface. For example, when the first composite member and/or the second composite member is long, heating can be performed at once in a width direction (one direction).

The sheet heater includes a heat generating unit (3a) made of graphite, and insulating layers (3b) that sandwich and fix the heat generating unit.

The sheet heater is a graphite heater. Namely, the sheet heater is structured to include the heat generating unit made of graphite, and the insulating layers that sandwich and fix the heat generating unit. A short heating time and a high reaching temperature can be realized by using graphite for the heat generating unit. For example, the heat generating unit made of graphite can reach 1300° C. in a heating time of approximately 0.2 seconds.

A composite material bonding method according to one aspect of the present disclosure includes: a heating step of locating a sheet heater having a planar shape at an insertion position between a first bonding surface of a first composite member and a second bonding surface of a second composite member facing the first bonding surface, so as to be parallel to the first bonding surface and to the second bonding surface, and of causing the sheet heater to heat the first bonding surface and the second bonding surface; a retracting step of retracting the sheet heater to a retract position to be retracted from the insertion position; and a bonding step of causing the first bonding surface and the second bonding surface to approach each other, and of bonding the first bonding surface and the second bonding surface to each other.

REFERENCE SIGNS LIST 1 composite material bonding apparatus
3 graphite heater (sheet heater)
3a heat generating unit
3b insulating layer
5 pressurizing plate (pressurizing means)
7 pressurizing actuator (pressurizing means)
9 component holding stay (approaching and separating device)
11 direct power supply
15 temperature adjustment unit
W1 first composite member
W1a bottom portion
W1b side portion
W1c first bonding surface
W1d first back surface
W2 second composite member
W2c second bonding surface
W2d second back surface

The invention claimed is:

1. A composite material bonding method comprising:
a heating step of locating a sheet heater having a planar shape at an insertion position between a first bonding surface of a first composite member and a second bonding surface of a second composite member facing the first bonding surface, so as to be parallel to the first bonding surface and to the second bonding surface, and of causing the sheet heater to heat the first bonding surface and the second bonding surface;
a retracting step of retracting the sheet heater to a retract position to be retracted from the insertion position; and
a bonding step of causing the first bonding surface and the second bonding surface to approach each other, and of bonding the first bonding surface and the second bonding surface to each other, wherein
the sheet heater includes a heat generating unit made of graphite and insulting layers that sandwich and fix the heat generating unit.

* * * * *